A. KOEGLER & C. H. NICOLL.
HOSE-NOZZLE.

No. 193,522. Patented July 24, 1877.

Witnesses.
Otto Ahfeland.
Chas Wahlers

Inventors.
Adolf Koegler
Charles H. Nicoll
by
Van Santvoord & Hauff
their attorneys

UNITED STATES PATENT OFFICE.

ADOLPH KOEGLER AND CHARLES H. NICOLL, OF NEWARK, N. J.

IMPROVEMENT IN HOSE-NOZZLES.

Specification forming part of Letters Patent No. 193,522, dated July 24, 1877; application filed July 6, 1877.

*To all whom it may concern:*

Be it known that we, ADOLPH KOEGLER and CHARLES H. NICOLL, both of Newark, in the county of Essex and State of New Jersey, have invented a new and useful Improvement in Hose-Nozzles, which invention is fully set forth in the following specification, reference being had to the accompanying drawings, in which—

Figure 1:
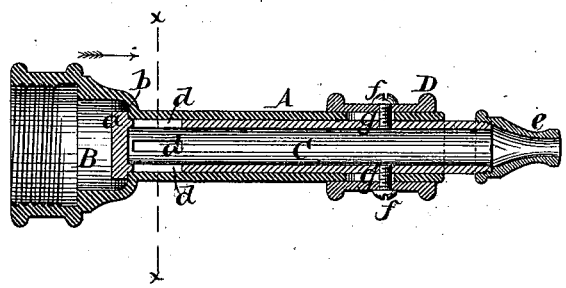
Figure 2:
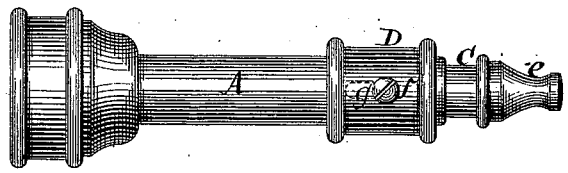
Figure 3:

Figure 1 represents a longitudinal central section of a nozzle containing our improvement. Fig. 2 is a side view thereof. Fig. 3 is a cross-section in the plane $x\ x$, Fig. 1.

Similar letters indicate corresponding parts.

Our invention relates to the construction of nozzles for hose; and consists in a tubular stem having a shoulder in the rear part thereof, in combination with a tubular slide, which extends through said tubular stem, and which is closed at its rear end, while it is provided with a flange forming a valve, and having its seat on said shoulder, and also provided with lateral discharge-openings contiguous to its rear or closed end, so that if the tubular stem is connected to the end of a hose the pressure of the liquid therein tends to keep the tubular slide in a forward position, and thereby to hold the valve in contact with its seat, so as to prevent the escape of the liquid, while if the tubular slide is moved inward, the liquid is admitted thereto through its lateral openings, and escapes at its outer end.

It consists, also, in combining with the aforesaid tubular stem and tubular slide a sliding ring, which is fitted on the tubular stem, and connected to the tubular slide by means of screws or rivets (one or more) passing through longitudinal slots in the tubular stem, so that such screws or rivets are capable of a longitudinal movement together with the ring and tubular slide, while by means of the ring the tubular slide can be moved in either direction with facility.

In the drawing, the letter A designates the tubular stem of our nozzle, having a screw-thread at its rear end, by which it can be connected to a hose-coupling of ordinary form, and in the interior and rear part of which is formed a shoulder, $b$. This shoulder is formed by enlarging the rear part of the stem A, as shown, a chamber, B, being thereby also formed for the working of a valve, hereinafter described.

The letter C designates a tubular slide, which is fitted in the stem A and closed at its rear end, where it is also provided with a flange, $a$, projecting outward. In the side of this tubular slide C are formed openings $d$, the same being located near its rear or closed end, and on its outer end is arranged a spout, $e$. The flange $a$ constitutes a valve, and it has its seat on the shoulder $b$. If desired, this valve $a$ may be beveled, and a packing-ring, moreover, may be interposed between the same and its seat $b$.

It will be seen that when the tubular stem A is connected to the end of a hose the tubular slide C is held in a forward position by the pressure of the liquid passing through the hose, and thereby the valve is held shut, while if the tubular slide C is moved inward, the liquid passes through the lateral openings $d$ of said slide, and escapes at the outer end thereof.

The tubular slide C is moved inward by means of a ring, D, which is fitted and slides on the tubular stem A, and which is connected to said slide by means of screws $f$ passing through the slots $g$, formed in and extending lengthwise of the stem A. The slots $g$ permit of a longitudinal movement of the screws $f$ when the ring D is moved on the stem A, and by their means the slide C is caused to partake of the motion of said ring.

It may be remarked that in some cases the forward portion of our nozzle is incased in a piece of india-rubber tubing to obviate breakage of the parts when the nozzle is thrown violently on the ground.

The sliding ring D may be provided with an extension on its outer end, having an internal screw-thread, so that if the tubular slide C is provided with a corresponding external thread near its outer end, the ring can be connected to the slide by means of said extension, and thus the strain on the screw $f$ is reduced.

What we claim as new, and desire to secure by Letters Patent, is—

1. The combination, in a hose-nozzle, of a tubular stem, A, having a shoulder, $b$, in the rear part thereof, with a tubular slide, C, which extends through said stem and is closed at its rear end, being provided with a flange, $a$, forming a valve, and having its seat on said shoulder, and also provided with lateral openings $d$, contiguous to its rear or closed end, all adapted to operate substantially as described.

2. The combination, with the tubular stem A and tubular slide C, of a sliding ring, D, which is fitted on the said stem, and connected to the tubular slide by means of screws or rivets $f$ (one or more) passing through longitudinal slots $g$ in said stem, substantially as and for the purpose described.

In testimony that we claim the foregoing we have hereunto set our hands and seals this 2d day of July, 1877.

ADOLPH KOEGLER. [L. S.]
CHARLES H. NICOLL. [L. S.]

Witnesses:
A. LEWIS MORROW,
WM. H. MORROW.